Dec. 9, 1924.
O. H. LEE
1,518,408
DRILL PRESS AND TAPPING MACHINE
Filed April 23, 1921   3 Sheets-Sheet 1
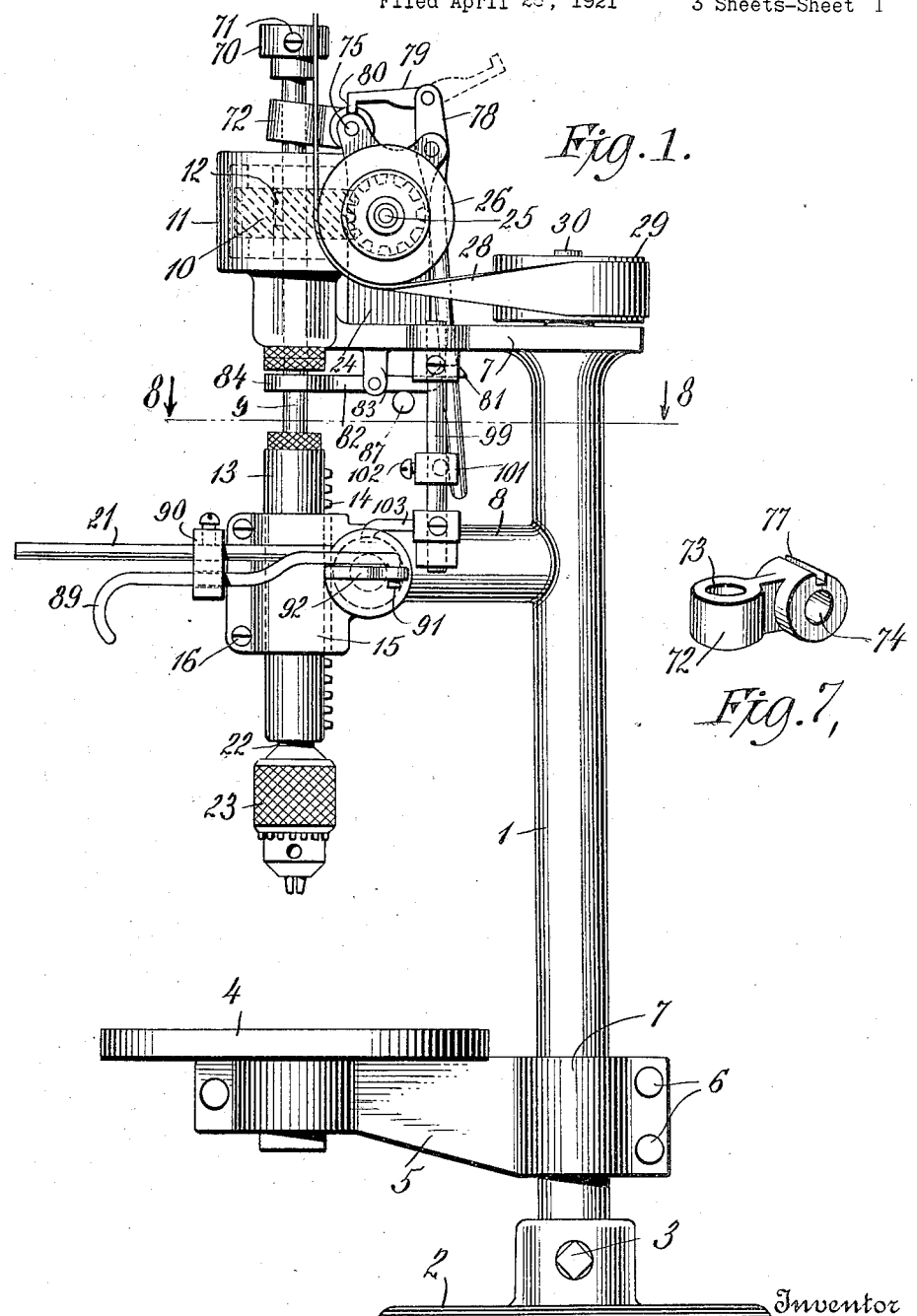

Dec. 9, 1924.                                                1,518,408
O. H. LEE
DRILL PRESS AND TAPPING MACHINE
Filed April 23, 1921          3 Sheets-Sheet 2
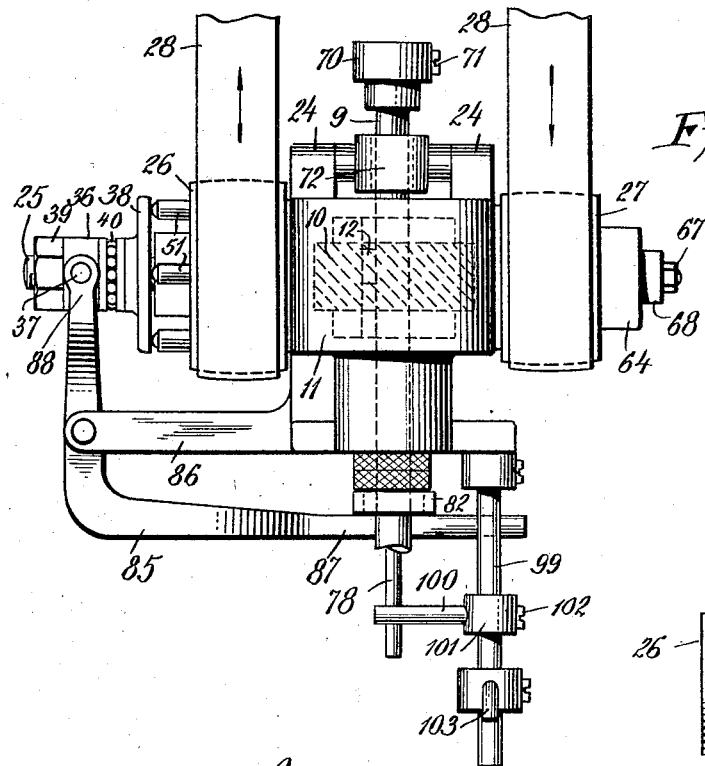
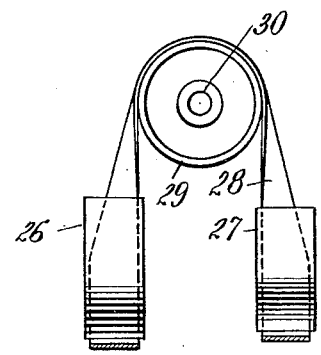
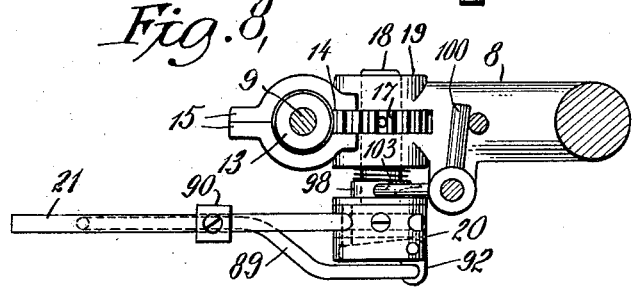
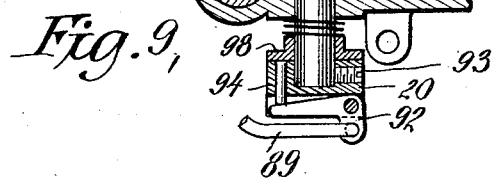
Inventor
Oliver Horton Lee
By his Attorneys
Pennie, Davis, Marvin, & Edmonds

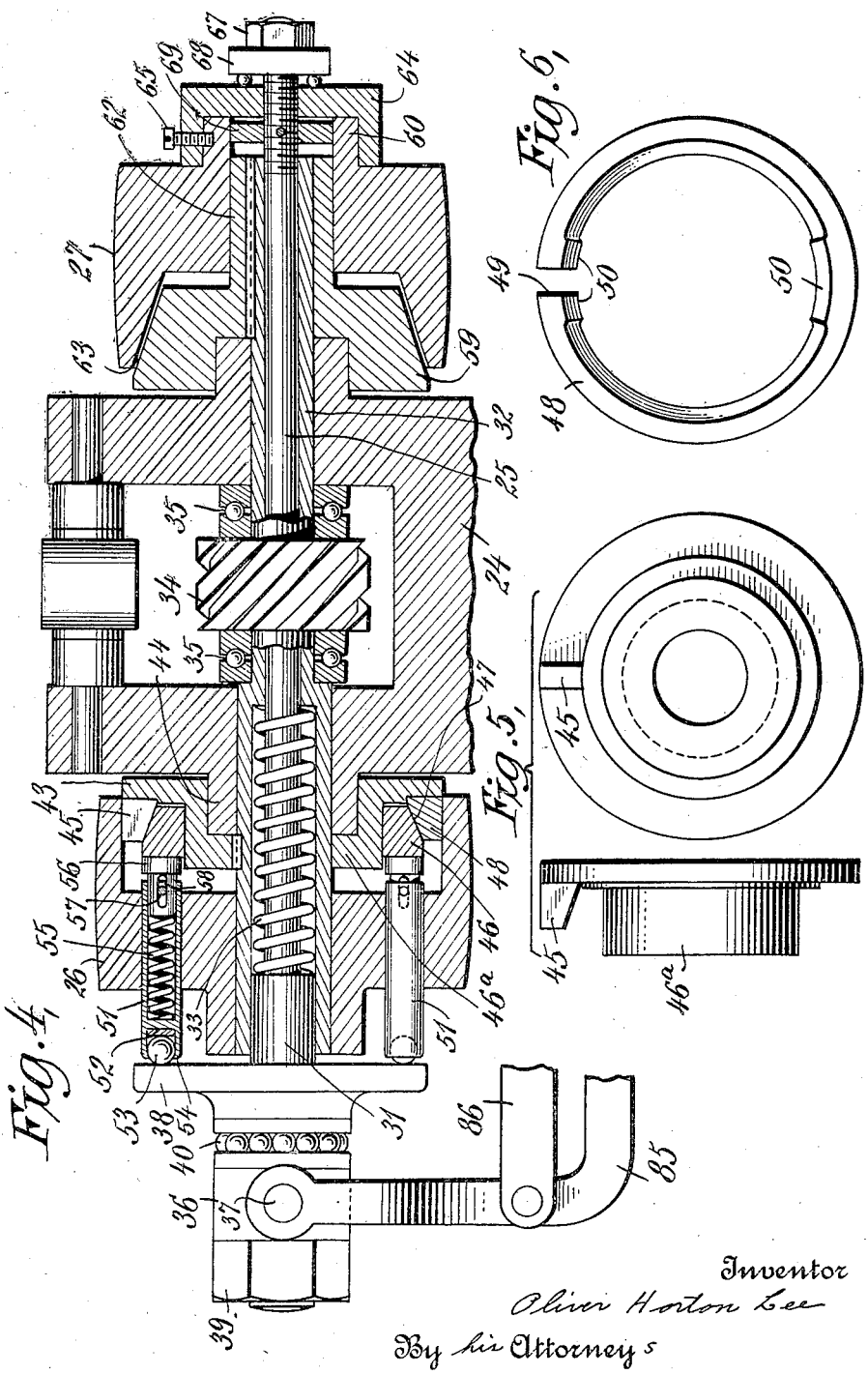

Patented Dec. 9, 1924.

1,518,408

UNITED STATES PATENT OFFICE.

OLIVER HORTEN LEE, OF PHILADELPHIA, PENNSYLVANIA.

DRILL PRESS AND TAPPING MACHINE.

Application filed April 28, 1921. Serial No. 465,203.

*To all whom it may concern:*

Be it known that I, OLIVER HORTEN LEE, a citizen of the United States, residing at 2824 North 8th Street, Philadelphia, in the county of Philadelphia, State of Pennsylvania, have invented certain new and useful Improvements in Drill Presses and Tapping Machines; and I do hereby declare the following to be a full, clear, and exact description of the invention, such as will enable others skilled in the art to which it appertains to make and use the same.

The present invention relates to a combined drill press and tapping machine.

At the present time taps, bolts, and other threaded machine parts which are not standard and manufactured by automatic machinery are commonly made by hand or on an ordinary lathe or drill press. To properly manufacture such parts in this manner considerable skill is required, and the parts are not only costly due to the high price necessary to obtain skilled labor, but are often of poor or non-uniform quality due to incompetency or carelessness of the worker.

The principal object of the present invention is to provide an apparatus which may be used as an ordinary drill press and which is also capable of being used to tap or thread parts to a predetermined depth, so that such parts may be assembled in properly adjusted relation by merely screwing up the threaded connections to the limit of the threads formed upon them.

It is also an object of the invention to provide an apparatus of the above type which is adapted to perform drilling, tapping, threading, and like operations in a wide range of sizes and upon parts which cannot be conveniently operated upon in the present type of automatic machinery.

It is also an object to provide such an apparatus similar in dimensions and method of operation to an ordinary drill press which may be operated by a relatively unskilled worker, and whose cost is sufficiently low to make its commercial adoption practicable.

To this end my improved machine consists primarily of a reversing attachment for the drill press spindle with an automatic control therefor by means of which the spindle carrying the tap for cutting the thread or the bolt to be threaded in the stationary die, as the case may be, is automatically reversed when the thread has been cut to a predetermined extent, which is determined in advance by the setting of the machine. By this arrangement the threading of all parts for each setting of the machine will be exactly duplicated without attention on the part of the operator other than removing the finished pieces and replacing them with unthreaded parts at the end of each complete operation of the machine.

My improved machine also embodies an emergency device by means of which the machine may be stopped or reversed at any desired point of its travel should the machine be functioning improperly. My improved machine also embodies other features of advantage which will be hereinafter pointed out.

I have illustrated a preferred embodiment of my invention in the accompanying drawings, in which—

Figure 1 is an elevational view illustrating a combined drill press and tapping machine embodying my invention;

Fig. 2 is an elevational view of a portion of the apparatus taken at right angles to Fig. 1;

Fig. 3 is a plan view of a detail;

Fig. 4 is a detailed sectional elevation showing the driving mechanism of the apparatus;

Figs. 5, 6 and 7 are views illustrating details of the operating mechanism;

Fig. 8 is a sectional view taken on the line 8—8 of Fig. 1; and

Fig. 9 is a sectional view through the emergency mechanism shown in Fig. 8.

Referring to the drawings, especially to Figs. 1 and 2, 1 indicates a vertical supporting stand of common type having a base 2 attached to the frame member 1 by means of set screw 3. A table 4 for supporting the work is carried by means of a horizontal bracket 5, the bracket and table being bodily adustable in a vertical direction by means of bolts 6 adapted to draw together the gripping arms 7 of the bracket 5 and clamping the table at any desired height on the supporting column 1, and at the same time preventing rotation of the bracket in a horizontal plane.

At the top of the vertical support 1 there is provided a horizontal supporting arm 7 extending out at one side of member 1 and serving to support the operating mechanism of the apparatus. Somewhat below the extension 7 is a bracket or arm 8 extending out from member 1 in parallelism with extension 7 and serving principally as a guide for steadying the vertical motion of the operating shaft of the apparatus. These arms 7 and 8 are preferably cast integrally with the member 1 but may be made of separate pieces and attached by means of bolts or screws if desired.

The actuating mechanism for the drilling or tapping tool comprises a short shaft 9 mounted for rotation and also for longitudinal movement relative to the frame member 1, and whose position is such that its axis is substantially in alinement with that of the table 4 when this table is swung into position for the work to be operated on. The upper portion of the shaft 9, together with its spiral gear 10, is enclosed in a housing 11 which is preferably formed integrally with the extension member 7 and provided with a removable top for affording access to the enclosed mechanism. Gear 10 is associated with its shaft by means of a key or projection 12 formed integrally with the shaft and fitting in a vertical slot extending through the entire thickness of the gear. This key serves to transmit rotation to the shaft but is, however, free to move vertically through the gear and thus permit the machine tool to follow up the work which is being done. It will be understood that the gear is supported between two bearing members associated with the frame of the apparatus for preventing its vertical movement and that the key moves freely in the slot of the gear. The lower part of shaft 9 is encased within a sleeve 13 which is provided at its side nearest the member 1 with teeth 14 constituting a vertical rack, and the sleeve itself is enclosed by clamping flanges 15 which may be tightened around the sleeve by means of the screws 16.

Cooperating with rack 14 is a pinion 17, the arrangement being best shown in Figs. 8 and 9. Pinion 17 is secured to a shaft 18 rotatably supported in a bearing 19 provided at the outer end of the bracket member 8 and having its axis horizontal and perpendicular to that of the member 8. There is also secured to shaft 18 a member 20 provided with a hole for receiving a handle or turning lever 21. By turning lever 21 the pinion 17 is rotated about its axis and displaces sleeve 13 in a vertical direction. By pressing down on the lever 21 the tool which is held in the usual chuck 23 at the lower end of the shaft may be pressed into the work, the downward pressure of the sleeve 13 being transmitted to the rotating shaft through a collar or bearing attached to the shaft just above the chuck.

Supported on the extension member 7 is a bracket member 24 which serves as a bearing support for the horizontal driving shaft 25. This shaft is provided at its opposite ends with driving pulleys 26 and 27 over which is trained a belt 28. This belt contacts with each pulley over an arc of approximately 90°, and is led around an idler 29 mounted for rotation on a vertical spindle 30 set in the top of the frame member 1. The movement of the belt over the driving pulley 26 is always opposite in direction to its movement over pulley 27, an upward movement over pulley 26 and a downward movement over pulley 27 being shown in the drawings. The power for the apparatus may be derived from a common line shaft or an individual motor as desired.

Referring to Fig. 4, the shaft 25 is a through shaft extending the entire length of the driving mechanism. The end of the shaft adjacent the pulley 26 is enlarged at 31, and both ends of the shaft are provided with screw threads. Surrounding the shaft 25 is an enclosing sleeve 32 designed to fit closely about the shaft at the end adjacent pulley 27 but enlarged at the opposite end sufficiently to surround the enlarged portion 31 of the shaft and at the same time provide an annular cavity for receiving a coil spring 33, one end of which rests against the shoulder formed at the inner end of the enlarged shaft portion 31. The other end of the spring abuts against the inner wall of the annular cavity formed in sleeve 32. A spiral gear 34 is secured to sleeve 32 at approximately the center of its length. This gear is adapted to mesh with the spiral gear 10 and transmit rotation of the horizontal sleeve 32 to the vertical shaft 9. This gear, together with a pair of ball bearings 35, occupies the space between the vertically extending arms of the bracket member 24 and serves to hold the sleeve 32 in fixed longitudinal relation to the frame of the apparatus.

A collar 36 provided with diametrically opposite studs 37 surrounds the enlarged portion 31 of the shaft between a flanged member 38 fixed to or integral with the shaft 25, and a retaining nut 39 on the end of the shaft. A set of ball bearings 40 is provided between collar 36 and the member 38. The pulley 26 is mounted for rotation upon the enlarged portion of the sleeve 32 and is formed at its inner side with a cylindrical cavity within the pulley shell and coaxial with it. Secured to the sleeve 32 by means of a key is a clutch member 43 having an outer diameter slightly less than the inner diameter of the pulley shell. At its outer edge the member 43, as shown in detail in Fig. 5, is provided a lug or projection 45 whose outer face is flush with the circumference of the member and whose inner face is tapered as shown.

A clutch expanding member 46 is provided to fit loosely over the hub of member 43, its outer surface being tapered as shown, and surrounding the tapered surface of the member 46 is a clutch ring 48, illustrated in detail in Fig. 6. This ring is divided at one portion of its circumference to provide free ends 49 which may be spread out or brought together to change the external dimensions of the rings. At the divided portion of the ring and also at a point diametrically opposite, bosses 50 are provided whose inner surfaces are carefully machined to accurately fit upon the tapered surface 47 of the ring 46 when in operative position. The ring is held in place by the lug 45 which projects into the space between the ends 49 of the ring.

Normally the outer diameter of the clutch ring 48 is slightly less than the inner diameter of the pulley shell, and the pulley is free to rotate without contacting with it. However, if pressure is applied on the exposed face of member 46 in the direction of the shaft, the tapered face 47 will contact with the cooperating faces of the bosses 50 and spread out the ends 49 of the ring, thus increasing its outside diameter and causing it to contact with the inner surface of the pulley shell and transmit the rotation of the pulley to the clutch ring and the shell 32. For expanding the clutch a number of holes are provided at equally spaced intervals around pulley 26, and in each hole is secured a cylindrical casing 51 divided by a partition 52 into two compartments. The smaller compartment is at the outer end of the tube and contains a ball 53 retained between partition 52 and an inwardly directed flange 54, and is adapted to work on the bearing surface of the member 38, thus minimizing friction during rotation of the pulley relative to the member 38.

The larger of the two compartments within tube 51 is occupied by a coil spring 55 whose inner end rests against the partition 52 and whose outer end abuts against the inner face of a member 56, having a sliding fit in the inner end of the tube 51. A slot 57 is provided in the side of member 56 to work over a pin 58 which is secured to the body of the tube 51, thus permitting longitudinal sliding movement of member 56 and at the same time setting a limit upon the extent of such movement. The inner end of member 56 protrudes from shell 51 and is provided with a flat face adapted to be pressed against the exposed face of the ring 46 by means of coil spring 55.

When a pressure is exerted on the end of shaft 25 the spring 33 is compressed and the shaft moves longitudinally within sleeve 32. Since the member 38 moves longitudinally with the shaft, the pressure is transmitted to balls 53 and tubes 51 are carried along in a longitudinal direction, thus compressing springs 55 and causing members 56 to be pressed against the ring 46. Due to this pressure upon ring 46 the clutch ring 48 will be expanded, and a frictional driving engagement will be established between the pulley and sleeve 32 which carries the driving gear 34.

At its other end sleeve 32 is provided with a cone clutch member 59 secured in fixed relation to the sleeve by means of a key. Pulley 27 is mounted for rotation upon the hub 62 of the clutch member 59, and is provided with a clutch face 63 cooperating with an engaging surface of member 59.

A retaining cup 64 is fitted over shaft 25 at the outer side of pulley 27, and attached to the hub 60 of the pulley. A longitudinal pressure on cup 64 serves to slide the pulley along the hub 62 and thus bring its beveled portion into engagement with member 59, imparting rotation to it. A retaining nut 67 and a collar 68 are provided at the end of the shaft to retain the movable parts in place. Sleeve 32 terminates short of the end of shaft 25, and a disk 69 is fixed to the shaft to shift the pulley in a direction to release the clutch. As shown in Fig. 4, the shaft 25 has been moved longitudinally a sufficient amount to carry pulley 27 out of engagement with member 59, but not sufficiently to take up the lost motion between the pins 58 and the sleeves 59. The pulley 26 is also free in this position as the springs 55 are not strong enough to expand the clutch ring 48.

In this position the machine stands idle with both pulleys 26 and 27 freely rotating on the shaft 32. This is the normal position of the machine when not in use or between operations, and the clutch-shifting shaft 25 is adjusted to and maintained in this position by the operating handle 87 in a manner which will be later described.

Referring to Fig. 1, 70 indicates a collar secured near the top of the vertical shaft 9 by means of a set screw 71 and adjustable vertically on the shaft to any desired position. Below collar 70 is a member 72 (shown in detail in Fig. 7) provided at one end with a vertical bore 73 of diameter somewhat greater than that of shaft 9 and adapted to fit around the shaft. The other end of the member 72 is provided with a horizontal bore 74 working on a pin supported between the vertical arms of bracket member 24 and affording a pivotal support for the member 72 on the frame of the apparatus. This portion of the member 72 is also provided with a groove 77 extending in parallelism to its bore 74. A rod or lever 78 is also pivoted to the bracket 24 at a point near the upper end of the lever. At its upper end lever 78 carries a pivoted finger 79, having at its outer extremity a hook 80 adapted to engage in groove 77 of member 72. Near the lower end of lever 78 there is provided a collar 81 having a flat lower face and an inclined upper face. This sleeve is attached to the lever 78 in any suitable manner (not shown) so as to be adjustable to any desired position.

Cooperating with this collar 81 is clutch-locking member 82 pivoted to a bracket 83 extending downwardly from the extension 7 of the apparatus frame. One end of this locking member 82 is enlarged to surround shaft 9, and the other end is adapted to engage beneath collar 81. A clutch-shifting member 85, best shown in Fig. 2, is pivoted to a horizontally extending bracket 86 and is formed with a lever portion 87 underlying the locking member 82. The other end of the clutch-shifting member 85 is forked at 88 to engage with pins 37 provided on the clutch-shifting collar 36.

In operation of the machine, after the work is secured in place on table 4 and a proper tool has been fastened in the holder 23, the pivoted finger 79 of lever 78 is dropped into engagement with slot 77 as shown in the position indicated in full lines in Fig. 1. The direct drive clutch (i. e. the split ring clutch) is then set by pressing down on the lever portion 87, thereby also placing coil spring 33 under compression. When the clutch-shifting member is sufficiently depressed to expand the clutch ring 45 the locking member 82 will catch beneath collar 81, thus holding the clutch members in engagement after the lever is released.

The tool is then moved down to the work by means of handle 21. As the tool follows down into the work, collar 70 approaches member 72 and finally contacts with it. Further downward motion of the collar causes member 72 to swing about its pivot 75, and consequently exerts a pull on the pivoted finger 79. This pull rotates lever 78 about its pivot and releases collar 81 from engagement with the clutch locking member 82. Spring 33 is now released and immediately expands, thereby releasing clutch 45 and throwing reverse pulley 27 into engagement with its clutch member 63 and effecting reverse movement of the tool. This reverse movement is permitted to continue until the tool backs itself completely out of the work. The handle 21 will then be operated to raise the tool to permit the removal of the completed work and the substitution of a new piece to be threaded.

If the machine is to be operated on a fresh piece of work immediately after the completion of the preceding work, the reverse clutch may be left in operation until the second piece to be threaded is positioned in the work holder, and the operator can then shift from reverse to direct drive. If, however, the machine is to be idle for any appreciable time, the operator can set both clutches in release position by merely elevating the tool holder through the handle 21 until the upper bearing of the shaft guide 13 engages the locking member 82 of the clutch-shifting lever and moves it sufficiently to disengage the reverse clutch but not sufficiently to set the split ring clutch. This degree of movement can easily be determined by the operator, for the reason that when the lost motion in the clutch-setting pins of the split ring clutch is taken up, there will be an appreciably greater resistance to movement of the clutch-operating lever, due to the resistance of the clutch ring itself to expansion. The friction of the shaft bearing in its guide is sufficient to maintain the bearing in this position and the wear between the shaft-bearing and the guide may be taken up by tightening the screws 16 in the split side of the bearing.

Previous to the commencement of the operation collar 70 may be set in any desired position upon the shaft 9, and as subsequent operations are performed the tool will always descend to the same depth before reversal occurs as long as the adjustment of collar 12 is not changed. Tapping of machine parts or threading of bolts may be accomplished in quantity by merely re-setting the clutch-shifting mechanism after each operation, and the tool automatically descends each time to exactly the same depth.

In addition to the operating handle 21 an emergency lever 89 is provided for use in case the tool becomes caught in the work or otherwise functions improperly. The handle 89 is mounted in a block 90 attached to handle 21, where it may be easily grasped in case of emergency by the operator while holding handle 21. Emergency lever 89 is provided at its inner end with a downwardly projecting portion 91 pivoted to one arm of a lever 92, itself pivoted to the member 20 which is fixedly secured to shaft 18 by means of set screw 93. Intermediate between member 20 and the body portion of the bracket member 8 is a collar 98 held against the member 20 by a coiled spring interposed between the collar and the machine frame, whereby the collar is allowed a limited movement on the shaft 18 between the machine frame and the member 20. The pin 94 is mounted in the member 20 for movement in parallelism with the shaft 18, the inner end of the pin engaging the collar 98, while its outer end lies under the free end of the lever 92, thereby normally holding the end of the lever pressed away from the member 20 under the action of the spring. The collar 98 is flanged as shown, and engaging the flange is a finger 103 secured to the lower end of a vertical shaft 99 supported for rotation on the machine frame in bearings attached to the upper part 7 and bracket 8, respectively. This shaft is provided near the middle of its length with a second horizontally extending arm or finger 100 which is preferably adjustable along the rod by means of a set screw 102. The rod 100 is positioned so that its projecting end lies normally in engagement with the free end of the lever 78 when the lever is set in position to maintain the split ring clutch in engagement, that is, when the clutch-locking member 82 is held in position by the collar 81 on the lever 78. If for any reason it becomes necessary to stop the operation of the machine, as for instance if the tool or work developed a flaw, with resultant damage to the thread, the operator has only to give an outward pull to the emergency lever 89, thereby turning the lever 92 on its pivot. This movement, through the medium of the pin 94 will shift the collar 98 toward the machine frame, thus turning the vertical shaft 99 in its bearings and throwing the lever 78 to the right, as shown in Fig. 1, thus releasing the clutch lever and allowing the spring 33 to expand, disengaging the direct driving clutch and setting the reverse clutch, thereby effecting the immediate withdrawal of the tool from the work.

The apparatus may be operated as an ordinary drill press by merely releasing the pivoted finger 79 from its engagement with member 72 and turning it to the inoperative position shown in dotted lines on Fig. 1. A drill or other tool may then be placed in the tool holder 23 and the clutch-shifting member 85 moved into operative position to effect a direct drive of the shaft 9, which shaft is now free to move up and down throughout the entire extent of its movement without actuating the reverse mechanism. The tool is moved to the work by means of handle 21 and may be forced down upon the work with any desired pressure by means of this handle in the ordinary manner. The emergency mechanism is operative when the apparatus is used in this maner, since the clutch-locking member 82 is in position beneath collar 81 for the purpose of holding the clutch spring 33 compressed and driving the drill. Actuation of the emergency lever will cause a rotation of the vertical rod 99 whose finger 100 is in engagement with the lower end of lever 78 and thus interrupt the engagement between shoulder 81 and member 82 in the same manner as if the finger 79 were in operative engagement.

While I have illustrated and described a preferred embodiment of my invention, it is to be understood that various changes such as employing an individual motor for each apparatus, and the like, may be made.

The manner of supporting the parts of the mechanism may be changed to suit the convenience of any particular installation, and the details of construction may be variously modified without departing from the scope of the invention as defined in the appended claims.

I claim:

1. In an apparatus of the class described, an operating shaft, a driving pulley adapted to rotate said shaft in a forward direction, a second driving pulley adapted to rotate said shaft in the reverse direction, clutches for operatively connecting either of the pulleys to said shaft and a clutch-controlling mechanism comprising a spring, means for setting one said clutch and simultaneously compressing said spring, and means actuated by said shaft for releasing said clutch and also releasing said spring from compression, said second clutch being operatively connected with said spring to be set by the expansion thereof the pressure on said clutch being such as to permit slipping of the clutch and stopping of the tool upon encountering undue resistance.

2. In an apparatus of the class described, an operating shaft having both longitudinal and rotational movement, means for rotating said shaft in opposite directions, said means comprising two clutches, a spring arranged to hold one of said clutches in engagement, a lever for setting the other said clutch, connections between said spring and lever whereby the movement of the lever to set one clutch compresses the spring to release the second clutch and the expansion of the spring shifts the lever to release the first mentioned clutch upon the setting of the second clutch, and means controlling the movement of said lever comprising a latch for holding the lever in position with the spring compressed, and means operated by the movement of the shaft for releasing said latch at a predetermined point in the longitudinal movement of the shaft.

3. In an apparatus of the class described, an operating shaft, means for rotating said shaft in opposite directions, said means comprising two clutches, a spring arranged to hold one of said clutches in engagement, a lever for setting the other said clutch, connections between said spring and lever whereby the movement of the lever to set one clutch compresses the spring to release the second clutch, and the expansion of the spring shifts the lever to release the first mentioned clutch upon the setting of the second clutch, and means controlling the movement of said lever comprising a latch for holding the lever in position with the spring compressed, and means operated by the movement of the shaft for releasing said latch.

4. In an apparatus of the class described, an operating shaft having both rotational and longitudinal movement, means for driving the shaft in both forward and reverse directions comprising two driving connections, one of which effects the rotation and longitudinal movement in one direction and the other of which effects opposite rotation and longitudinal movement, means actuated by said shaft for rendering one said driving connection inoperative and the other connection operative at a predetermined point in its travel, and means operable at will for rendering both said driving connections inoperative.

In testimony whereof I affix my signature.

OLIVER HORTEN LEE.